(12) United States Patent
Galloway (10) Patent No.: US 9,696,998 B2
(45) Date of Patent: Jul. 4, 2017

(54) PROGRAMMABLE SUBSTITUTIONS FOR MICROCODE

(71) Applicant: ADVANCED MICRO DEVICES, INC., Sunnyvale, CA (US)

(72) Inventor: Frank C Galloway, Dripping Springs, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 476 days.

(21) Appl. No.: 14/014,220

(22) Filed: Aug. 29, 2013

(65) Prior Publication Data
US 2015/0067389 A1     Mar. 5, 2015

(51) Int. Cl.
| G06F 9/30 | (2006.01) |
|---|---|
| G06F 9/44 | (2006.01) |
| G06F 11/00 | (2006.01) |
| G06F 11/36 | (2006.01) |

(52) U.S. Cl.
CPC ............ G06F 9/3016 (2013.01); G06F 11/36 (2013.01); G06F 11/3644 (2013.01); *G06F 9/3013* (2013.01); *G06F 9/30014* (2013.01); *G06F 9/30072* (2013.01); *G06F 11/3636* (2013.01)

(58) Field of Classification Search
CPC ............ G06F 11/3636; G06F 9/30072; G06F 9/3016; G06F 11/36; G06F 11/3644; G06F 9/3001; G06F 9/30014; G06F 9/3013

USPC ............................ 712/226, 227, 222; 714/35
See application file for complete search history.

(56) References Cited

U.S. PATENT DOCUMENTS

| 5,796,972 | A * | 8/1998 | Johnson | .................... | G06F 8/66 712/208 |
|---|---|---|---|---|---|
| 5,805,475 | A * | 9/1998 | Putrino | .................. | G06F 7/483 708/204 |
| 6,715,062 | B1 * | 3/2004 | Moore | ................ | G06F 9/30003 712/227 |
| 6,718,460 | B1 * | 4/2004 | Prakash | ................ | G06F 9/3844 712/207 |
| 7,251,759 | B2 * | 7/2007 | Turner | ................ | G06F 13/4059 714/718 |
| 7,657,695 | B1 * | 2/2010 | Wheeler | ................. | G06F 9/455 711/159 |
| 2008/0263338 | A1 * | 10/2008 | Ohkubo | ................ | G06F 9/3005 712/227 |
| 2009/0177876 | A1 * | 7/2009 | Wang | .................. | G06F 9/30145 713/1 |

* cited by examiner

*Primary Examiner* — Daniel Pan (57) ABSTRACT

The apparatuses, systems, and methods in accordance with the embodiments disclosed herein may facilitate modifying post silicon instruction behavior. Embodiments herein may provide registers in predetermined locations in an integrated circuit. These registers may be mapped to generic instructions, which can modify an operation of the integrated circuit. In some embodiments, these registers may be used to implement a patch routine to change the behavior of at least a portion of the integrated circuit. In this manner, the original design of the integrated circuit may be altered.

22 Claims, 7 Drawing Sheets

PROGRAMMABLE SUBSTITUTIONS FOR MICROCODE

BACKGROUND

Technical Field

Generally, the disclosed embodiments relate to integrated circuits, and, more particularly, modifying processor operations using programmable substitutions.

Description of the Related Art

Conventional processor-based systems from personal computers to mainframes typically include a central processing unit (CPU) that is configured to access instructions or data that are stored in a main memory. Processor-based systems may also include other types of processors such as graphics processing units (GPUs), digital signal processors (DSPs), accelerated processing units (APUs), co-processors, or applications processors. Entities within the conventional processor-based system communicate by exchanging signals over buses or bridges such as a northbridge, a southbridge, a Peripheral Component Interconnect (PCI) Bus, a PCI-Express Bus, or an Accelerated Graphics Port (AGP) Bus.

Some or all of the processors, buses, or bridges in the processor-based system may be fabricated on an integrated circuit (IC) using a circuit design created by engineers, typically using automated design software. The design of an IC for a system, which may include multiple ICs, is typically verified using a suite of tests to ensure that the IC functions correctly. Testing of the IC during the design, development, fabrication, or operational stages is generally referred to as debugging the IC. With the evolution of processing technologies and reduction of size and increase in complexity of devices, debugging of circuit designs has become more and more difficult to perform using traditional simulation tools and techniques. Once a device is tested at a post-fabrication level, engineers may desire a change in operation of the device. These changes may be prompted by the discovery of a bug in the system, or by a desire to modify the capabilities or operations of the device. Designers generally use software to override the behavior of the integrated circuit. This solution can be cumbersome, and requires overriding the behavior of existing hardware of the integrated circuit, such as disable one or more features of the integrated circuit.

SUMMARY OF EMBODIMENTS

The apparatuses, systems, and methods in accordance with the embodiments disclosed herein may facilitate modifying post silicon instruction behavior. Embodiments herein may provide registers in predetermined locations in an integrated circuit. These registers may be mapped to generic instructions, which can modify an operation of the integrated circuit. In some embodiments, these registers may be used to implement a patch routine to change the behavior of at least a portion of the integrated circuit. In this manner, the original design of the integrated circuit may be altered.

Some embodiments provide an a method that include receiving a request to implement a patch mode for a first execution unit; selecting, in response to receiving the request, a first patch mode for implementing a patch. The first patch mode comprises information regarding an operational change relating to at least a portion of the execution unit. The method also includes selecting a first replacement instruction for providing the operational change, selecting a first replacement data type for the first replacement instruction; and implementing the operational change by executing the first replacement instruction using the first replacement data type.

Some embodiments provide an a method that include determining if a hardware error is present in a device; determining an execution unit of the device affected by the hardware error; executing a patch routine in response to determining the execution unit affected by the hardware error; determining at least one reserved instruction in response to executing the patch routine, the at least one reserved instruction to provide an alternative operation of the execution unit; determining a value for a data type for the reserved instruction; providing the data type to the execution unit for execution of the reserved data; and executing an alternative operation of the execution unit based upon the patch routine.

Some embodiments provide an a method that include determining whether an operational change is required for a device; determining an execution unit of the device affected by the operational change; executing a patch routine in response to determining the execution unit affected by the operational change, determining at least one reserved instruction in response to executing the patch routine. The reserved instruction is adapted to provide an alternative operation of the execution unit. The method also includes determining a value for a data type for the reserved instruction; providing the data type to the execution unit for execution of the reserved data; and executing an alternative operation of the execution unit based upon the patch routine.

Some embodiments provide an integrated circuit that includes an execution unit for performing a computing operation; and a programmable patch unit for modifying at least one operation of the execution unit. The programmable patch unit comprises a programmable instruction and a programmable data type for executing the programmable instruction. The programmable instruction is capable of being programmed to modify the at least one operation of the execution unit.

Some embodiments provide a non-transitory computer-readable medium storing instructions executable by at least one processor to fabricate an integrated circuit device. The integrated circuit device includes an execution unit for performing a computing operation; and a programmable patch unit for modifying at least one operation of the execution unit. The programmable patch unit includes a programmable instruction and a programmable data type for executing the programmable instruction. The programmable instruction being capable of being programmed for modifying the at least one operation of the execution unit.

BRIEF DESCRIPTION OF THE FIGURES

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

Embodiments provide for modifying post silicon instruction behavior. Programmable registers and reserved instructions may be provided such that operations of an integrated circuit can be modified. Embodiments provide for placing programmable registers into predetermined location in the integrated circuit, wherein the registers may be mapped to generic instructions that can be utilized to alter the behavior of the integrated circuit. For example, a patch routine to change the behavior of a portion of the integrated circuit, or to alter the original design, may be employed by embodiments herein.

Figure 1:
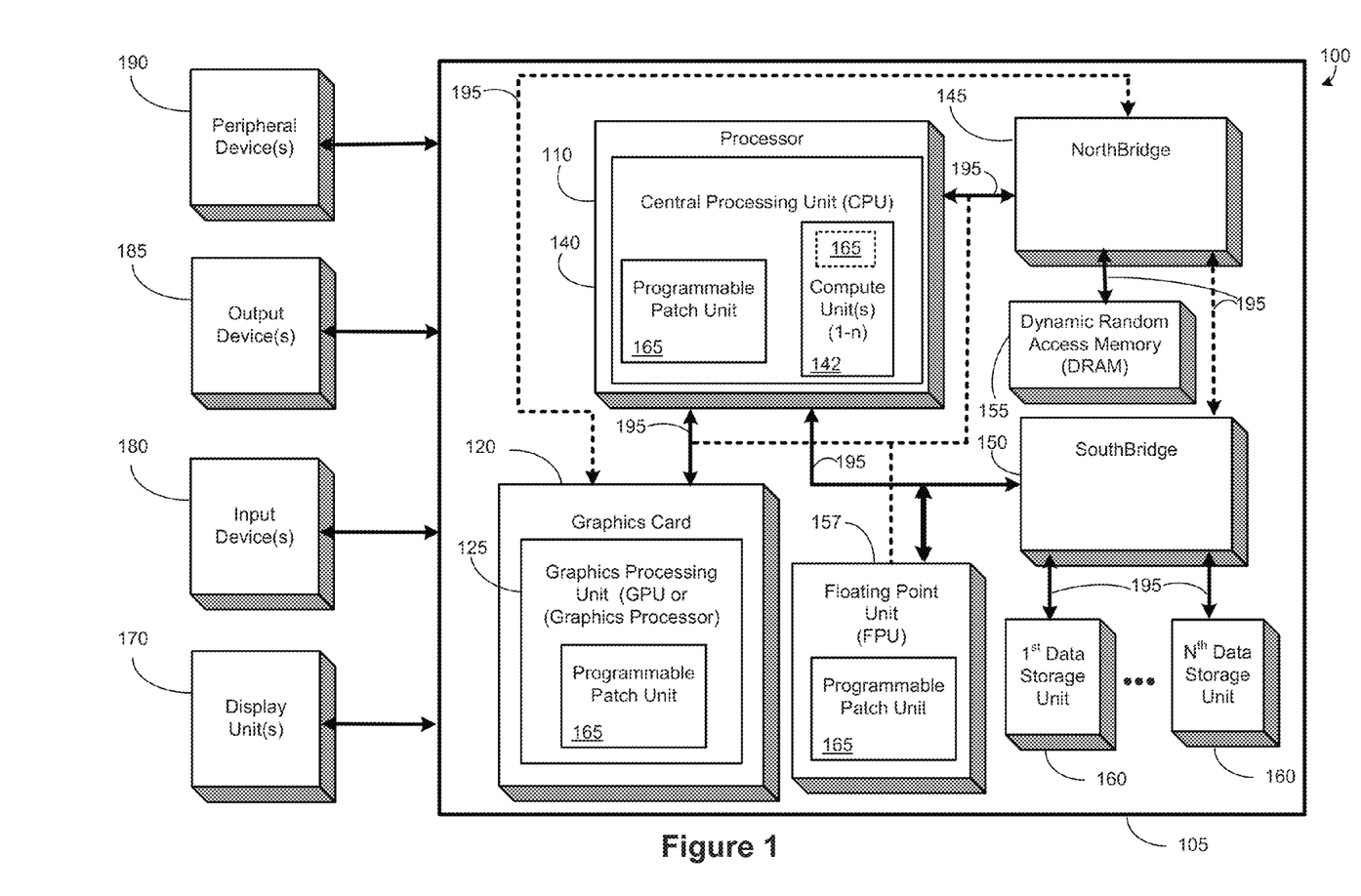
FIG. 1 is a schematic diagram of an exemplary microcircuit design in accordance with some embodiments.

The computer system 100 may comprise a processor 110, in accordance with some embodiments, is illustrated. Modern computer systems may exist in a variety of forms, such as telephones, tablet computers, desktop computers, laptop computers, servers, smart televisions, or other consumer electronic devices. The computer system may comprise a motherboard 105 and/or a housing that comprises various elements of the computer system 100. The processor unit 110 may comprise one or more central processing units (CPUs) 140. The CPU 140 is capable of performing various operations, including a programmable patch process that is capable of modifying the operation of the processor 110. The CPU 140 may comprise various compute units (e.g., core) 142, e.g. first through nth compute units. In some embodiments, each of the compute units 142 may represent a core of the CPU 140.

Some embodiments provide that the CPU 140 comprises a programmable patch unit 165. The programmable patch unit 165, in some embodiments comprises hardware circuitry, such as registers, multiplexers, etc., to provide for modifying the post-silicon behavior of the CPU 140. The hardware circuitry in the programmable patch unit 165 may be mapped to generic instructions. Utilizing a patch routine, the generic instruction may be used to override a behavior of the CPU. Therefore, using the programmable patch unit 165, the CPU may be debugged by modifying the behavior of the CPU 140 that may have caused an error or problem. Alternatively, if a modification in the behavior of the CPU 140 is desired for design or optimization reasons, the programmable patch unit 165 may be used to change the original design of the CPU 140.

In some embodiments, one or more compute units 142 may each comprise a programmable patch unit 165. In other embodiments, the compute units 142 may share one or more programmable patch units 165. In this manner, each of the operations of the compute units 142 may be altered post-silicon using the programmable patch unit 165. Further, the CPU 140, and/or the compute units 142 each may implement a floating point unit (FPU) for performing floating point operations. In some embodiment, each of these FPUs comprises a programmable patch unit 165 for performing post-silicon debugging and/or to provide for post-silicon functional or operational modifications. Moreover, the computer system 100 may comprise a floating point unit (FPU) 157, which in one embodiment, may be a separate processor. The FPU may comprise a programmable patch unit 165 for performing post-silicon debugging and/or to provide for post-silicon functional or operational modifications. In some embodiment, a plurality of execution units (e.g., CPU 140, GPU 125, FPU 157) may share a programmable patch unit 165.

The CPU(s) 140 may be electronically or communicatively coupled to a northbridge 145. The CPU 140 and northbridge 145 may be housed on the motherboard (not shown) or some other structure of the computer system 100. In some embodiments, the graphics card 120 may be coupled to the CPU 140 via the northbridge 145 or some other electronic or communicative connection. For example, CPU 140, northbridge 145, GPU 125 may be included in a single package or as part of a single die or "chip". The northbridge 145 may be coupled to a system RAM (or DRAM) 155 or the system RAM 155 may be coupled directly to the CPU 140. The system RAM 155 may be of any RAM type known in the art; the type of system RAM 155 may be a matter of design choice. The northbridge 145 may be connected to a southbridge 150. The northbridge 145 and southbridge 150 may be on the same chip in the computer system 100, or the northbridge 145 and southbridge 150 may be on different chips. The southbridge 150 may be connected to one or more data storage units 160. The data storage units 160 may be hard drives, solid state drives, magnetic tape, or any other non-transitory, writable media used for storing data. In various embodiments, the CPU 140, northbridge 145, southbridge 150, GPU 125, or system RAM 155 may be a computer chip or a silicon-based computer chip, or may be part of a computer chip or a silicon-based computer chip. The various components of the computer system 100 may be operatively, electrically, or physically connected or linked with a bus 195 or more than one bus 195. Some embodiments of the buses 195 may be result buses that are used to convey results of operations performed by one functional entity in the computer system 100 to another functional entity in the computer system 100.

The computer system 100 may be connected to one or more display units 170, input devices 180, output devices 185, or peripheral devices 190. These elements may be internal or external to the computer system 100, and may be wired or wirelessly connected. The display units 170 may be internal or external monitors, television screens, handheld device displays, touchscreens, and the like. The input devices 180 may be any one of a keyboard, mouse, trackball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Example peripheral devices 190 may include a CD/DVD drive capable of reading or writing to physical digital media, a USB device, Zip Drive, external hard drive, phone or broadband modem, router/gateway, access point or the like.

The GPU 125 and the CPU 140 may implement various functional entities including one or more processor cores, floating-point units, arithmetic logic units, load store units, translation lookaside buffers, instruction pickers, or caches such as L1, L2, or L3 level caches in a cache hierarchy. The GPU 125 may comprise a programmable patch unit 165 for performing post-silicon debugging and/or to provide for post-silicon functional or operational modifications.

Figure 2:
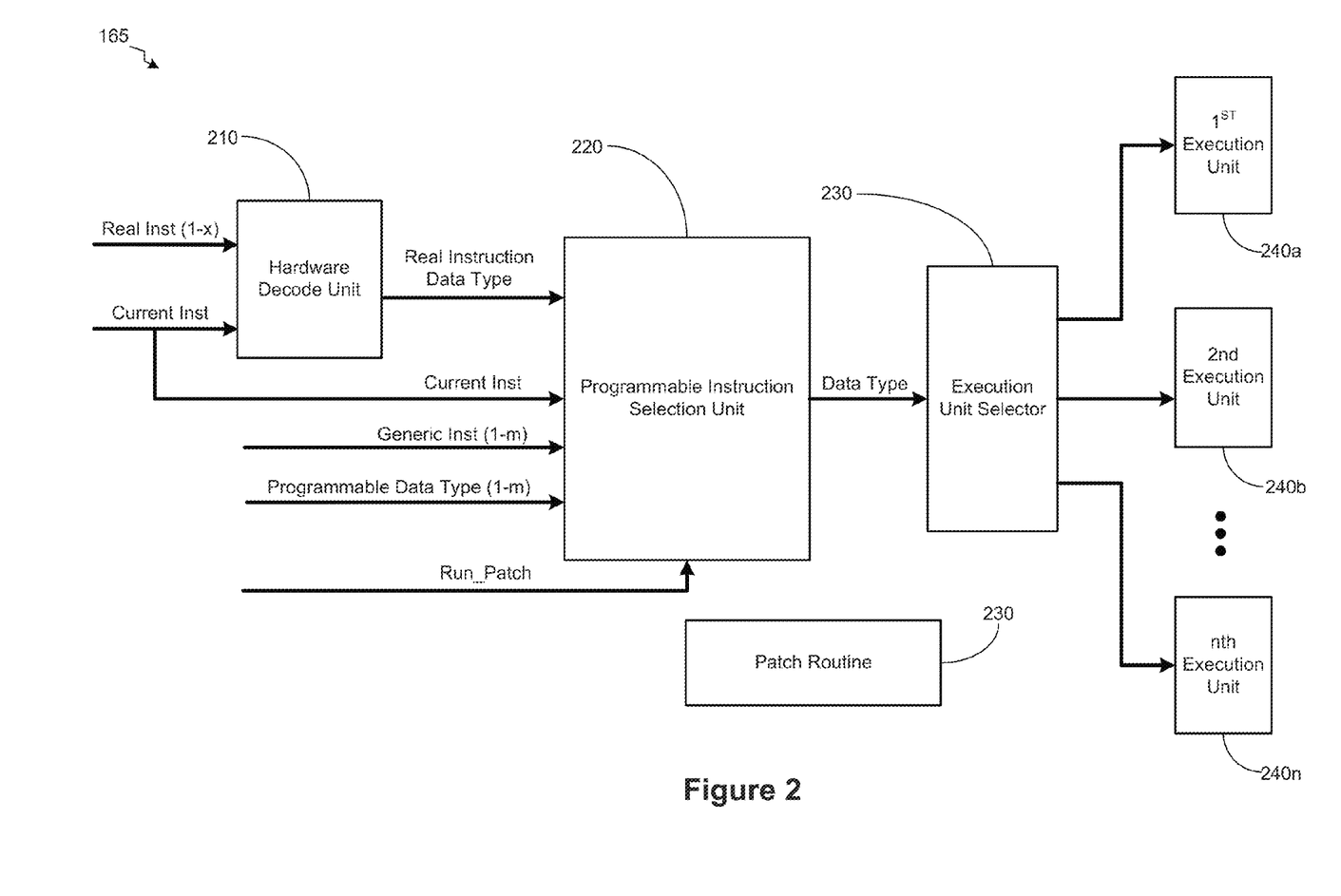
FIG. 2 provides a block diagram representation of a programmable patch unit of FIG. 1, in accordance with some embodiments.

Turning now to FIG. 2, a block diagram representation of the programmable patch unit 165 in association with an execution unit (e.g., CPU 140, compute unit 142, GPU 125, FPU 157, etc.), in accordance with some embodiments, is illustrated. The programmable patch unit 165 may comprise a patch routine 250 that controls various operations of the unit 165. The programmable patch unit 165 may comprise a hardware decode unit 210, a programmable instruction selection unit 220, and an execution unit selector 230. The programmable patch unit 165 may provide data types to one or more of first through nth execution units 240*a-n*. In some embodiments, the term "data types" may also refer to any value for operation control, such as an operation modifier. In some embodiments, the hardware decode unit may be a shared hardware decoding module (e.g., an x86 instruction decode module) of an execution unit 240*a-n*.

The hardware decode unit 210 may receive a current instruction, which refers to the instruction being executed in the present state of the device associated with the programmable patch unit 165. The hardware decode unit 210 may also receive "real" instructions, which may refer to instructions that are designed into the integrated devices of the system 100. The real instructions may refer to ops that are decoded by the hardware decode unit 210 to implement instruction, e.g., x86 instructions. In some embodiments, the real instructions are stored in a table within the hardware decode unit 210. The hardware decode unit 210 may comprise real instructions 1 through x (real inst_1 through real inst_x), which represent the allowed instructions. The hardware decode unit 210 may compare the current instruction to the real instructions, in some embodiments, by performing a lookup and comparison function. If the current instruction matches to one of the allowed real instructions, the result from the hardware decode unit is a data type, "real instruction data type." Without the benefit of some of the embodiments herein, the real instruction data type would be sent directly to one of the execution unit 240*a-n*, without an effective means for a workaround.

The programmable instruction selection unit 220 may receive the real instruction data type. The programmable instruction selection unit 220 may also receive one or more generic instructions (e.g., generic inst_1-generic inst_m). The generic instructions may refer to a reserved value of an operation (from the microcode perspective), that are not defined until a patch routine 250 is run. Therefore, the generic instructions are programmable in a post-silicon manner. When an error relating to particular instruction(s) is found, a trap may be implemented to jump to a patch for executing generic instructions that may have been programmed, providing a work-around the error without changing the microcode flow of the device.

Further, the programmable instruction selection unit 220 may also receive programmable data types (programmable data type_1 through type_m) that correspond to the generic instructions. The programmable data type_1-m may be field in a register (described below). In some embodiments, the programmable data type_1-m may be defined as a valid data type for use by the programmable instruction selection unit 220. When the patch routine 250 is run (e.g., the signal run_patch is asserted), the programmable instruction selection unit 220 may select one of the generic instructions (e.g., generic ins_2) and corresponding programmable data type (e.g., generic data type_2).

The output from the programmable instruction selection unit 220 may be the real instruction data types, or alternatively a programmable data type. The selection between the two may be made as a result of the patch routine 250, which may provide a signal such as run_patch. In some embodiments, the execution unit selector 230 may select an execution unit to which to send the data type. The execution unit selector 230 may comprise a multiplexer or other types of selection modules known to those skilled in the art. The data type may be the resultant of a real instruction and real instruction data type, or alternatively, if a patch routine 250 is run, the resultant of a generic instruction and a programmable data type. In this manner, a patch that modifies the designed behavior of the execution units 240a-n may be modified post-silicon, without performing the operation change via the microcode associated with the system 100. Therefore, if a problem or error is found in the hardware of the system 100, (i.e., a problem relating to the data type field used for the real instruction [real inst], Real Inst1) then a value of the data type (via the programmable data type_1-m) may be defined, a patch ucode may be run using a generic instruction (e.g., generic inst_2). When the patch routine 250 is run, the appropriate programmable data type (e.g., programmable data type_2) would be written for usage in operation of one of the execution units 240a-n. When the patch routine 250 is run on hardware, the current instruction may perform a comparison to the generic instruction, and select a programmable data type to be used in the execution units 240a-n.

Figure 3:
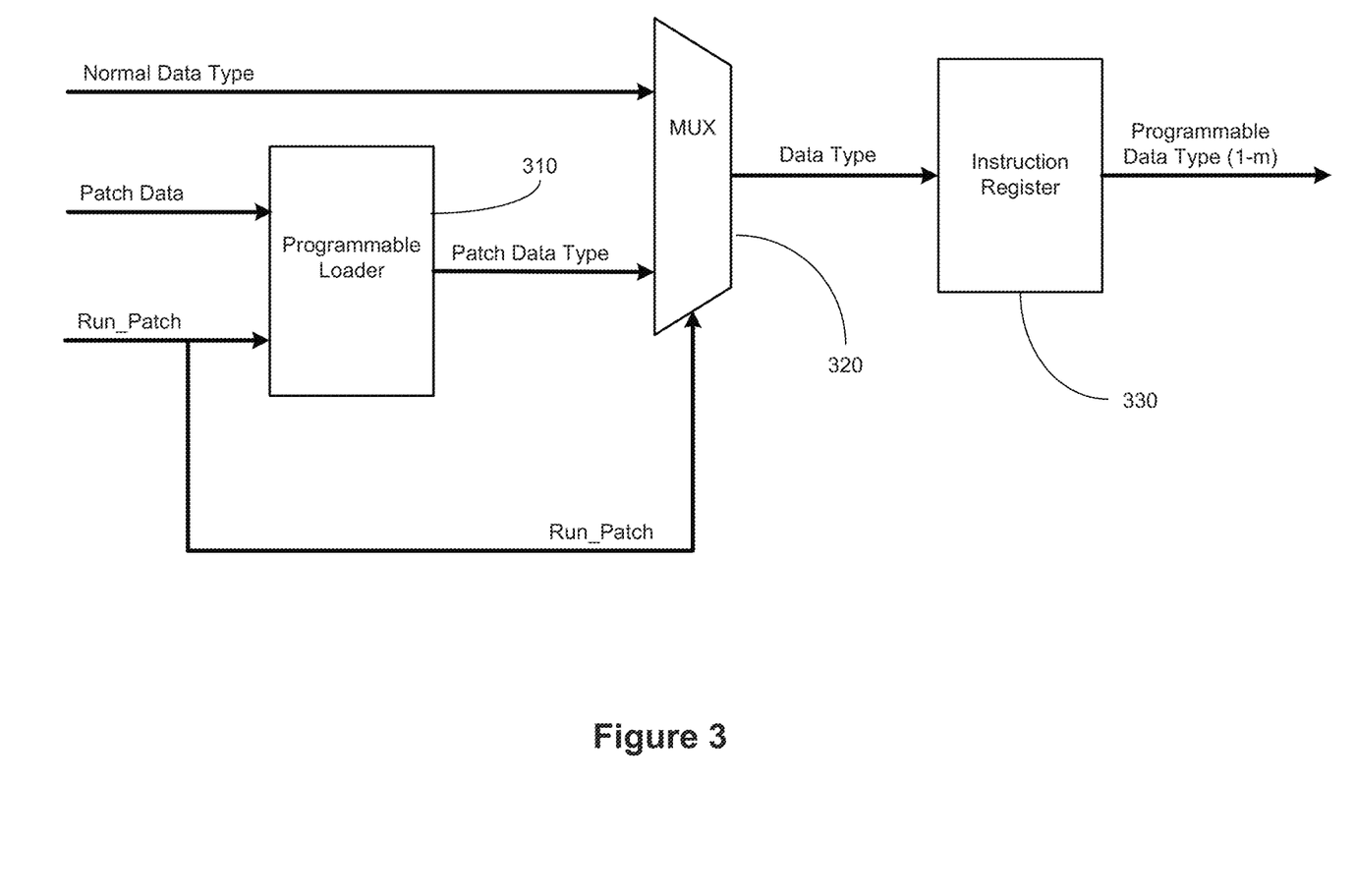
FIG. 3 provides a block diagram representation of circuitry for loading a programmable data type of FIG. 2, in accordance with some embodiments.

Turning now to FIG. 3, a block diagram depiction of a loader/register associated with the programmable patch unit 165, in accordance with some embodiments, is illustrated. The programmable patch unit 165 may also comprise a programmable loader 310, a multiplexer 320, and an instruction register 330. The programmable loader 310 may provide an appropriate patch data type, which may be programmable. The patch data may be provided to the programmable loader from an external source, such as a processor programmer. A run_patch signal may prompt the programmable loader to input patch data and/or provide the appropriate patch data type.

The patch data type may be sent to the multiplexer 320. Further, normal data type (i.e., data type relating to the real instruction data type utilized in the normal operation of devices in the system 100) is also sent to the multiplexer 320. Those skilled in the art would appreciate that the multiplexer 320 may represent one of a plurality of types selection objects, including a two-to-one multiplexer. Upon execution of the patch routine 250, the run_patch signal may cause the multiplexer 320 to select the patch data type as its output. Otherwise, the normal data type is provided at the output of the multiplexer 320. The output of the multiplexer is provided to the instruction register 330. The instruction register provides the various data types (see also FIG. 2). When the patch routine 250 is executed, the output of the instruction register 330 is the programmable data type (1-m). When the patch routine 250 is not executed, the output of the instruction register 330 is the real instruction data type. The programmable data type and the real instruction data type are sent to the programmable instruction selection unit 220 (see FIG. 2).

During fabrication of various portions of the system 100, elements of programmable patch unit 165 are provided as placeholders for later programming. For example, the generic instructions and the programmable data types are provided as place holder instructions and operands for affecting alterations in the operation of an execution unit 240. Therefore, post-silicon debugging or design changes may be made possible within existing reserved hardware and instruction sets, overriding the original behavior of an execution unit 240.

As an example, when an error is discovered during an operation of an execution unit (e.g., CPU 140, compute unit 142, GPU 125, FPU 157, etc.), a trap on the instruction(s) that relates to the error may be applied. Upon applying the trap, a jump to a patch may be made, a process that may be effectuated by a patch routine 250 in the programmable patch unit 165. For example, if a critical op (cop) "addpd," a floating point (avx) instruction is found to contain an error, a trap on instruction that uses the addpd cop may be implemented so that the process flow jumps to a patch in an attempt to work around the error. A generic cop may be used by implementing one or more of the generic instructions, generic inst_1-generic inst_m. The hardware table of the FPU would process this as a normal cop, whose decodes point to a programmable register containing the programmable data types. Floating point instructions typically utilize specific data types (e.g., double data type, single data type, packet date type, etc.), therefore, the appropriate programmable data type_1-m may be provided to the programmable register (described below) for performing the floating point patch operation. Moreover, a change in operation of the FPU regardless of an error may be desired. Therefore, the patch concepts described herein may be implemented to provide such change in operation. Those skilled in the art having benefit of the present disclosure would appreciate that the description above regarding an FPU may similarly apply to a variety of locations in the system 100, e.g. CPU 140, compute unit 142, GPU 125, FPU 157, etc.).

Figure 4:
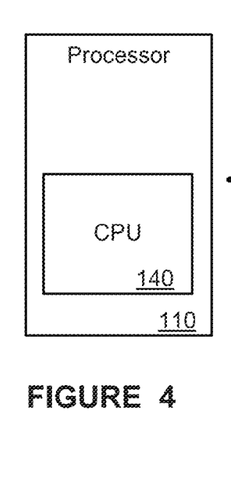
FIG. 4 provides a representation of a processor depicted in FIG. 1, in accordance with some embodiments.
Figures 5A, 5B:
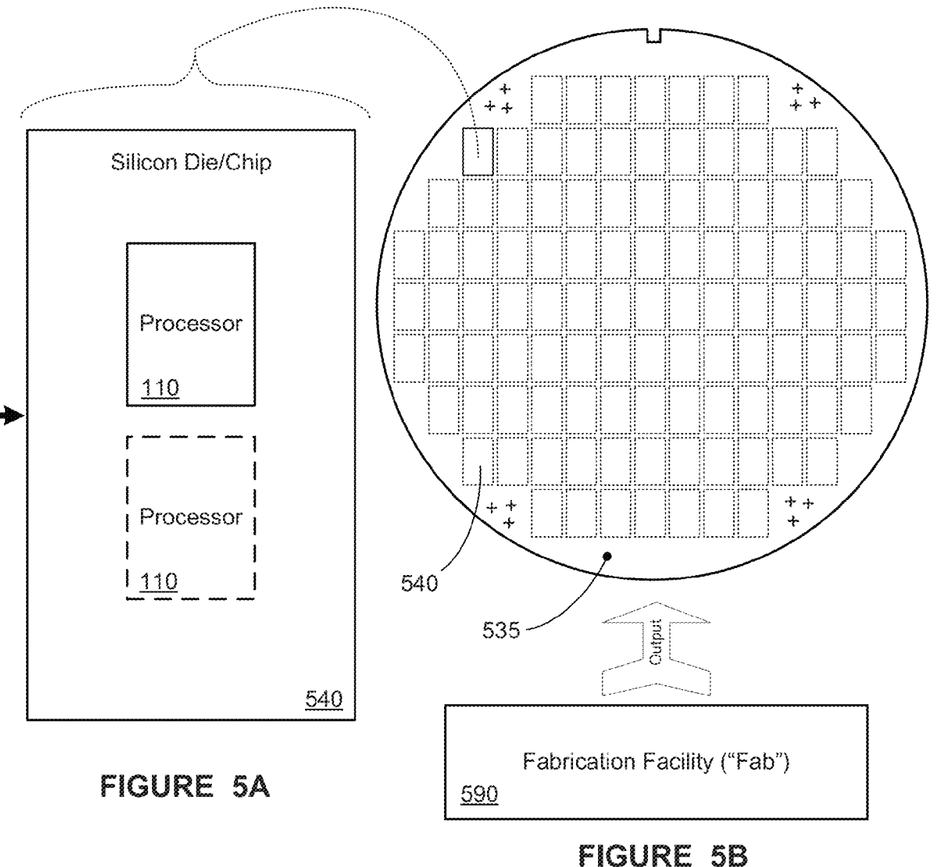
FIG. 5A provides a representation of a silicon die/chip that includes one or more circuits as shown in FIG. 3, in accordance with some embodiments.
FIG. 5B provides a representation of a silicon wafer which includes one or more dies/chips that may be produced in a fabrication facility, in accordance with some embodiments.

Turning now to FIG. 4 and FIG. 5A, in some embodiments, the processor unit 110 comprising a CPU 140 may reside on a silicon die/chip 540. The silicon die/chip 540 may be housed on a motherboard or other structure of the computer system 100. In some embodiments, there may be more than one processor unit 110 on each silicon die/chip 540. Some embodiments of the processor unit 110 may be used in a wide variety of electronic devices.

Turning now to FIG. 5B, in accordance with some embodiments, and as described above, the processor unit 110 may be included on the silicon chip/die 540. The silicon chip/die 540 may contain one or more different configurations of the processor unit 110. The silicon chip/die 540 may be produced on a silicon wafer 540 in a fabrication facility (or "fab") 590. That is, the silicon wafer 540 and the silicon die/chip 540 may be referred to as the output, or product of, the fab 590. The silicon chip/die 440 may be used in electronic devices.

The circuits described herein may be formed on a semiconductor material by any known means in the art. Forming may be done, for example, by growing or deposition, or by any other means known in the art. Different kinds of hardware descriptive languages (HDL) may be used in the process of designing and manufacturing the microcircuit devices. Examples include VHDL and Verilog/Verilog-XL. In some embodiments, the HDL code (e.g., register transfer level (RTL) code/data) may be used to generate GDS data, GDSII data and the like. GDSII data, for example, is a descriptive file format and may be used in some embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units, RAMs, compact discs, DVDs, solid state storage and the like) and, in some embodiments, may be used to configure a manufacturing facility (e.g., through the use of mask works) to create devices capable of embodying various aspects of some embodiments. As understood by one or ordinary skill in the art, this data may be programmed into a computer, processor, or controller, which may then control, in whole or part, the operation of a semiconductor manufacturing facility (or fab) to create semiconductor products and devices. In other words, some embodiments relate to a non-transitory computer-readable medium storing instructions executable by at least one processor to fabricate an integrated circuit. These tools may be used to construct the embodiments described herein.

Figure 6:
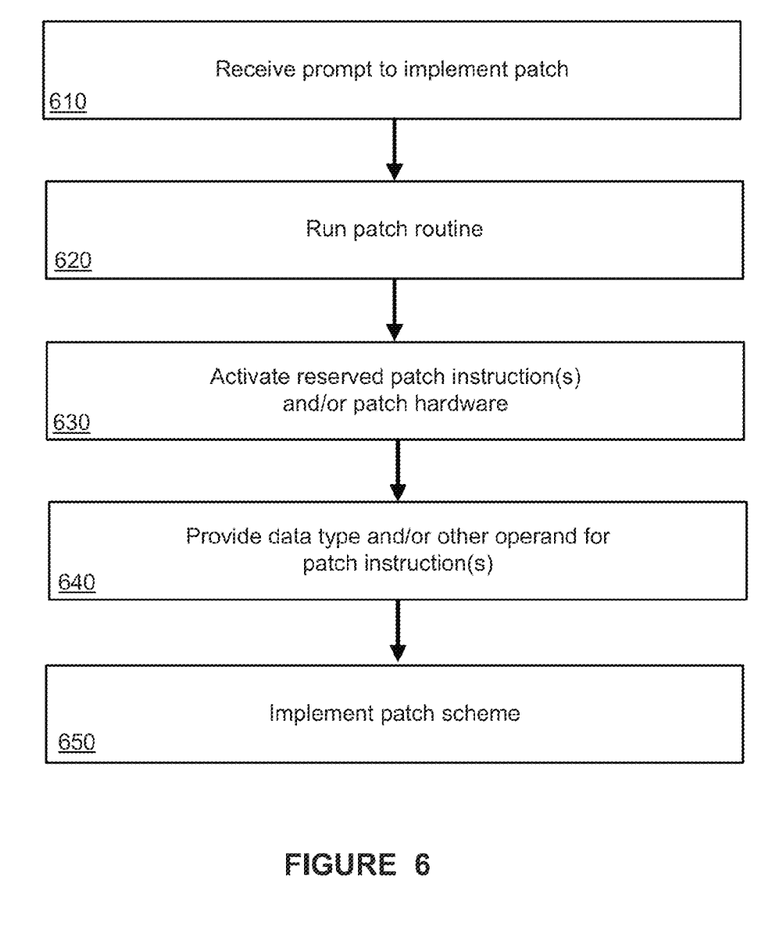
FIG. 6 is a flowchart of a method relating modifying post-silicon instruction behavior, in accordance with some embodiments.

Turning now to FIG. 6, a flowchart depiction of a method, in accordance with some embodiments, is illustrated. A device, such as an execution unit (e.g., CPU 140, GU 125, FPU 157, etc.) may receive a prompt [FIG. 6 has "indication"] (at 610) to implement a patch in order to alter a designed operation or correct an error in the operation of the execution unit. Upon receiving a prompt to implement a patch, a patch routine 250 may be executed (at 620). In some embodiments, the patch routine 250 may be comprised in, and executed by the programmable patch unit 165.

Figure 7:
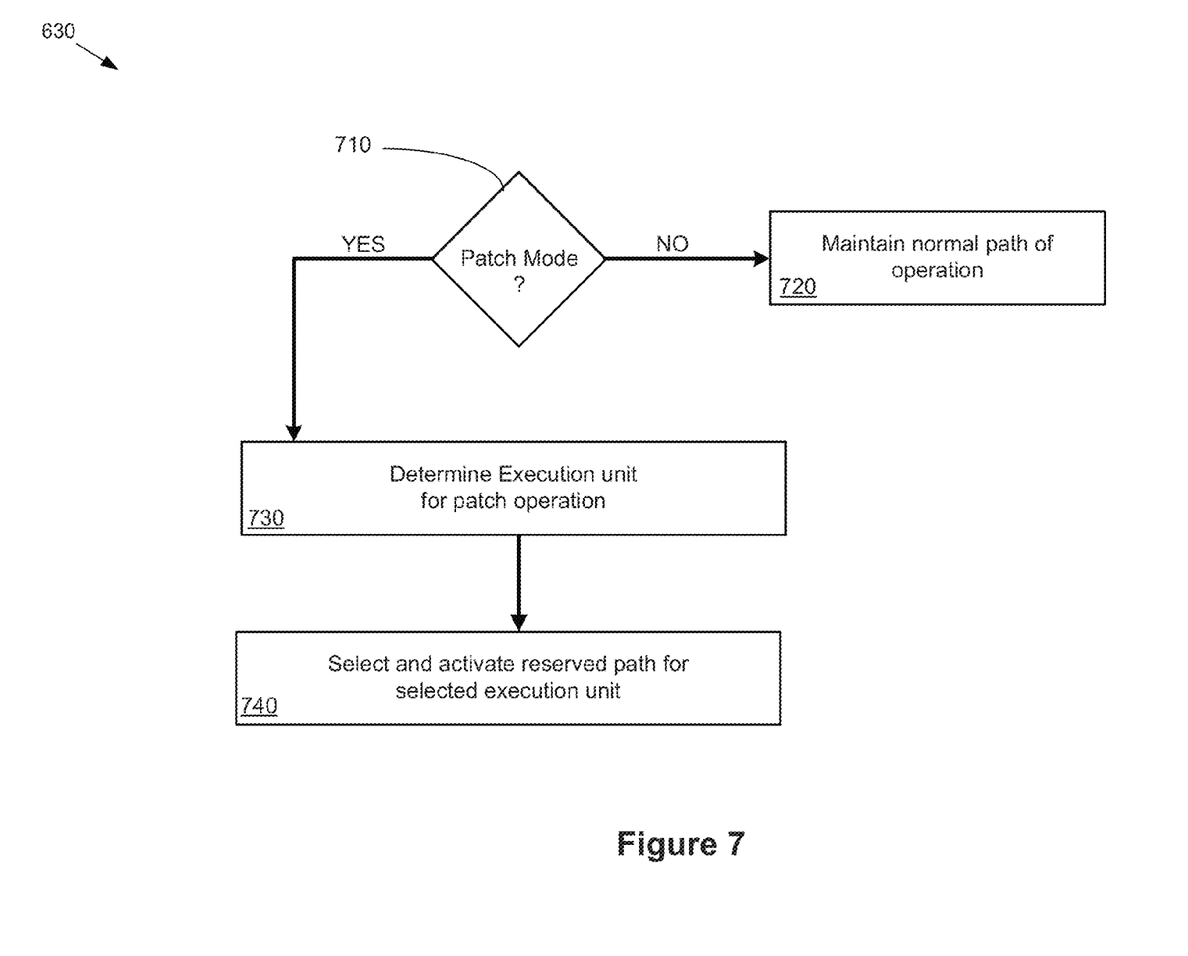
FIG. 7 is a flowchart of a method for activating reserve instruction path of FIG. 6, in accordance with some embodiments.

Upon execution of the patch routine 250 (at 620), the programmable patch unit 165 may activate one or more reserve patch instructions and/or patch hardware for implementing the patch (at block 630). Turning now to FIG. 7, a flowchart depiction of activating one or more reserve patch instructions and/or patch hardware (block 630 of FIG. 6), in accordance with some embodiments, is illustrated. A determination is made whether a patch mode has been invoked (at 710). Upon a determination that a patch mode has not been invoked, the integrated circuit is placed into a normal operation mode, wherein normal instruction data type paths are implemented (at 720). Upon a determination that a patch mode has been invoked, a determination is made as to the specific execution unit that is affected, as well as the type of patch that is to be invoked (at 730). The specific reserved path for the reserved instructions and for the reserved hardware is selected (at 740). For example, the reserved instruction, generic inst_2 and the programmable data type_2, as well as the associated hardware, may be selected and activated for implementing the patch modification.

Figure 8:
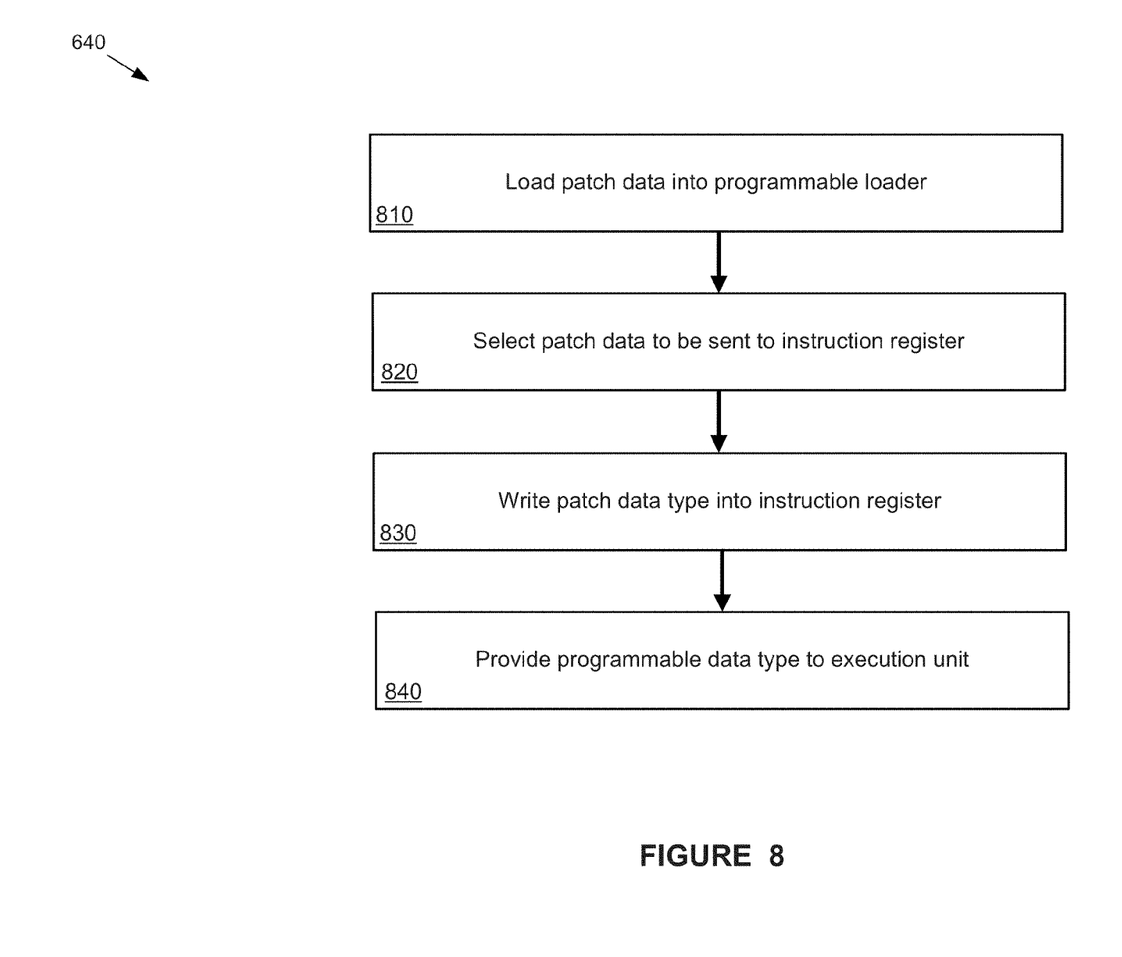
FIG. 8 is a flowchart of a method for providing a data type for a patch instruction of FIG. 6, in accordance with some embodiments.

Turning back to FIG. 6, upon activating the reserve patch instruction and/or patch hardware, a data type and/or operand for executing the patch instruction may be provided (at 640). Turning now to FIG. 8, a flowchart depiction of providing a data type and/or operand for executing the patch instruction, in accordance with some embodiments, is illustrated. The patch data (comprising information regarding the data type for the patch) is loaded into (at 810) the programmable loader 310 (see FIG. 3). In some embodiments, the programmable loader 310 may be part of the reserved hardware that may be invoked in order to implement a patch modification in the operation of the integrated circuit. In order to implement the patch, the programmable data type may be selected (at 820) to be sent to the instruction register 330 (e.g., see selection of patch data type in multiplexer 320 in FIG. 3). The programmable data type is then written (at 830) into the instruction register 330 for use in executing instructions (e.g., reserved instructions(s)). The programmable data type and/or operands for executing instructions are provided (at 840) to the execution unit.

Turning back to FIG. 6, upon providing programmable data type and/or operands, the patch scheme is implemented (at 650). Therefore, the modification of the operation of the selected execution unit (e.g., CPU 140, GU 125, FPU 157, etc.) may be implemented, thereby correcting for an error, or modifying a designed operation of the execution unit.

The methods illustrated in FIGS. 6, 7 and 8 may be governed by instructions that are stored in a non-temporal computer readable storage medium and that are executed by at least one processor of the computer system 100. Each of the operations shown in FIGS. 6-8 may correspond to instructions stored in a non-temporal computer memory or computer readable storage medium. In various embodiments, the non-temporal computer readable storage medium includes a magnetic or optical disk storage device, solid state storage devices such as Flash memory, or other non-volatile memory device or devices. The computer readable instructions stored on the non-temporal computer readable storage medium may be in source code, assembly language code, object code, or other instruction format that is interpreted and/or executable by one or more processors.

Embodiments of processor systems that implement embodiments of the debugging techniques as described herein (such as the processor systems 100, 300, 400) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed:

1. A method, comprising:
receiving a request to implement a patch mode for a first execution unit;
selecting, in response to receiving said request, a first patch mode for implementing a patch, said first patch mode comprising information regarding an operational change relating to at least a portion of said first execution unit;
selecting a first replacement instruction for providing said operational change;
selecting a first replacement data type for said first replacement instruction, the replacement data type indicating a mode of operation of the first execution unit that determines a format of a result of the first execution unit; and
writing said first replacement data type into an instruction register and implementing said operational change by executing said first replacement instruction according to said first replacement data type.

2. The method of claim 1, wherein receiving said request to implement said patch mode comprises detecting an error and prompting an operation change to overcome the error.

3. The method of claim 1, wherein the first replacement data type indicates a precision of operation for a floating point unit.

4. The method of claim 1, further comprising receiving an indication of an error in an operation of said first execution unit and providing said request to implement said patch mode in response to receiving said indication of said error.

5. The method of claim 4, further comprising implementing a trap in response to receiving an indication of said error and providing a jump to said first replacement instruction.

6. A method comprising:
determining if a hardware error is present in a device;
executing a patch routine in response to determining an execution unit of the device is affected by said hardware error;
determining at least one reserved instruction in response to executing said patch routine, said at least one reserved instruction to provide an alternative operation of said execution unit;
determining a value for a data type for said reserved instruction, the value indicating a mode of operation of said execution unit that determines a format of a result of said execution unit;
writing said data type into an instruction register and providing said data type to said execution unit for execution of the reserved instruction; and
executing an alternative operation of said execution unit based upon said patch routine.

7. The method of claim 6, wherein determining an execution unit of said device affected by said hardware error comprises determining whether at least one of a central processing unit (CPU), a compute unit of said CPU, a graphic processing unit (GPU), or a floating point unit (FPU) is affected by said hardware error.

8. The method of claim 6, further comprising implementing a trap in response to receiving an indication of said error and providing a jump to said reserved instruction.

9. The method of claim 6, wherein determining if a hardware error is present in a device comprises determining if a critical operation error is present.

10. The method of claim 9, wherein determining if said critical operation error is present comprises determining whether a floating point instruction error is present.

11. The method of claim 6, wherein determining said at least one reserved instruction comprises programming said at least one reserved instruction to provide a substitute task to replace a task in which said error was found.

12. A method comprising:
determining whether an operational change is required for a device;
executing a patch routine in response to determining an execution unit is affected by said operational change;
determining at least one reserved instruction in response to executing said patch routine, said at least one reserved instruction to provide an alternative operation of said execution unit;
determining a value for a data type for said reserved instruction, the value indicating a mode of operation of said execution unit that determines a format of a result of said execution unit;
writing said data type into an instruction register and providing said data type to said execution unit for execution of the reserved instruction; and
executing an alternative operation of said execution unit based upon said patch routine.

13. The method of claim 12, further comprising determining the execution unit of said device affected by said operational change comprises determining whether at least one of a central processing unit (CPU), a compute unit of said CPU, a graphic processing unit (GPU), or a floating point unit (FPU) is affected by said operational change.

14. An integrated circuit device, comprising:
an execution unit for performing a computing operation; and
a programmable patch unit for modifying at least one operation of said execution unit, said programmable patch unit comprising a programmable instruction and a programmable data type for executing said programmable instruction, the programmable data type is writable into an instruction register of the programmable patch unit for indicating a mode of operation of said execution unit that determines a format of a result of said execution unit, said programmable instruction being programmed to modify said at least one operation of said execution unit based on the programmable data type.

15. The integrated circuit device of claim 14, wherein said execution unit is at least one of a central processing unit (CPU), a compute unit of said CPU, a graphic processing unit (GPU), or a floating point unit (FPU).

16. The integrated circuit device of claim 14, wherein said programmable patch unit comprises a patch routine configured to program said programmable instruction and said programmable data type.

17. The integrated circuit device of claim 16, wherein said programmable patch unit is configured to:
   detect an operational error in an operation of said execution unit;
   determine if an instruction is a faulty instruction;
   implement a trap in response to determining that said instruction is a faulty instruction;
   jump to a patch operation in response to implementing said trap; and
   program said programmable instruction and said programmable data type for performing said patch operation.

18. The integrated circuit device of claim 16, wherein said programmable patch unit comprises:
   a hardware decode unit for decoding a normal instruction and a programmable instruction relating to an execution unit;
   a programmable instruction selection unit operative coupled to said hardware decode unit, said programmable instruction selection unit configured to select one of a normal instruction or a programmable instruction in response to a signal indicative of a patch operation, process at least one of said normal instruction or said programmable instruction; and provide a data type; and
   an execution selection unit to select one of a plurality of execution units to provide said data type.

19. The integrated circuit device of claim 18, wherein said programmable patch unit further comprises:
   a programmable loader configured to load a programmable data type for performing said patch operation; and
   a multiplexer operatively coupled to said programmable loader, said multiplexer to select one of a programmable data type or a normal data type in response to the signal indicative of a patch operation.

20. A non-transitory computer-readable storage medium storing instructions executable by at least one processor to fabricate an integrated circuit device, wherein the integrated circuit device comprises:
   an execution unit for performing a computing operation; and
   a programmable patch unit for modifying at least one operation of said execution unit, said programmable patch unit comprising a programmable instruction and a programmable data type for executing said programmable instruction, the programmable data type writable into an instruction register of the programmable patch unit for indicating a mode of operation of said execution unit that determines a format of a result of said execution unit, said programmable instruction programmed for modifying said at least one operation of said execution unit based on the programmable data type.

21. The non-transitory computer-readable storage medium of claim 20, wherein said programmable patch unit comprises:
   a hardware decode unit for decoding at a normal instruction and a programmable instruction relating to an execution unit;
   a programmable instruction selection unit operative coupled to said hardware decode unit, said programmable instruction selection unit configured to select one of a normal instruction or a programmable instruction in response to a signal indicative of a patch operation, process at least one of said normal instruction or said programmable instruction, and provide a data type; and
   an execution selection unit to select one of a plurality of execution units to provide said data type.

22. The non-transitory computer-readable storage medium of claim 21, wherein said programmable patch unit further comprises:
   a programmable loader configured to load programmable data type for performing said patch operation; and
   a multiplexer operatively coupled to said programmable loader, said multiplexer to select one of a programmable data type or a normal data type in response to a signal indicative of the patch operation.

* * * * *